(12) United States Patent
Carter

(10) Patent No.: US 10,533,485 B2
(45) Date of Patent: Jan. 14, 2020

(54) CONTROL VALVE

(71) Applicant: COLDFIRE, INC., Twin Falls, ID (US)

(72) Inventor: Dan Carter, Twin Falls, ID (US)

( * ) Notice: Subject to any disclaimer, the term of this patent is extended or adjusted under 35 U.S.C. 154(b) by 145 days.

(21) Appl. No.: 15/729,379

(22) Filed: Oct. 10, 2017

(65) Prior Publication Data

US 2018/0030881 A1 Feb. 1, 2018

Related U.S. Application Data

(63) Continuation-in-part of application No. 15/285,954, filed on Oct. 5, 2016, now Pat. No. 9,784,176, which is a continuation of application No. 14/529,439, filed on Oct. 31, 2014, now Pat. No. 9,611,782.

(60) Provisional application No. 61/926,689, filed on Jan. 13, 2014.

(51) Int. Cl.
| | |
|---|---|
| *F01P 11/04* | (2006.01) |
| *F01P 11/20* | (2006.01) |
| *F01P 3/20* | (2006.01) |
| *F02N 19/10* | (2010.01) |
| *F16K 11/087* | (2006.01) |
| *F02B 3/06* | (2006.01) |
| *F02N 19/02* | (2010.01) |

(52) U.S. Cl.
CPC ............... *F01P 11/04* (2013.01); *F01P 3/20* (2013.01); *F01P 11/20* (2013.01); *F02N 19/10* (2013.01); *F16K 11/0873* (2013.01); *F16K 11/0876* (2013.01); *F01P 2037/02* (2013.01); *F01P 2060/18* (2013.01); *F02B 3/06* (2013.01); *F02N 19/02* (2013.01); *Y10T 137/87249* (2015.04)

(58) Field of Classification Search
CPC ... F01P 11/04; F16K 11/0873; F16K 11/0876; Y10T 137/87249
See application file for complete search history.

(56) References Cited

U.S. PATENT DOCUMENTS

| | | | | |
|---|---|---|---|---|
| 1,990,773 A * | 2/1935 | Boynton | ................ | F16K 11/12 137/555 |
| 3,935,108 A * | 1/1976 | Forgues | ................ | B01D 35/00 210/340 |
| 4,345,621 A * | 8/1982 | Dunckhorst | ........ | F16K 11/0873 137/624.12 |
| 5,115,837 A * | 5/1992 | Tupper | ................... | B60K 15/06 137/544 |
| 5,193,582 A * | 3/1993 | Antoniello | ............. | E03C 1/023 137/625.14 |
| 5,988,218 A * | 11/1999 | Hecking | ............... | F24D 3/1008 137/625.29 |
| 7,059,349 B2 * | 6/2006 | Breda | ..................... | E03C 1/023 137/625.11 |
| 7,621,295 B2 * | 11/2009 | Reck | ..................... | F16K 5/0605 137/625.47 |
| 7,814,934 B2 * | 10/2010 | Thelen | ............... | B01D 53/0446 137/597 |

(Continued)

*Primary Examiner* — Matthew W Jellett
*Assistant Examiner* — Christopher D Ballman
(74) *Attorney, Agent, or Firm* — Shaver & Swanson, LLP; Scott D. Swanson

(57) ABSTRACT

A valve that has an inlet and an outlet in fluid connection in a first position. When the valve is in a second position fluid enters the first inlet and exits the second outlet and enters in a second inlet and out the first outlet. The valve can be used for example to add a fluid circuit to a preexisting circuit.

10 Claims, 6 Drawing Sheets

(56) References Cited

U.S. PATENT DOCUMENTS

| | | | | |
|---|---|---|---|---|
| 8,011,920 B2* | 9/2011 | Deng | ............... | F16K 11/0836 |
| | | | | 137/625 |
| 8,356,627 B2* | 1/2013 | Hoshi | ............ | G01F 1/36 |
| | | | | 137/557 |
| 8,505,576 B2* | 8/2013 | Renninger | ......... | F16K 27/003 |
| | | | | 137/269 |
| 8,555,923 B1* | 10/2013 | Minnick | ............ | F16K 5/0642 |
| | | | | 137/625.19 |
| 8,857,469 B2* | 10/2014 | Wang | ............... | F16K 11/074 |
| | | | | 137/625.15 |
| 2007/0113575 A1* | 5/2007 | Borre | ............... | F16K 11/0873 |
| | | | | 62/292 |
| 2010/0193043 A1* | 8/2010 | Erhardt | ............ | F16K 11/0873 |
| | | | | 137/215 |
| 2013/0263949 A1* | 10/2013 | Bartnick | .......... | F16K 11/0856 |
| | | | | 137/625 |
| 2014/0150870 A1* | 6/2014 | Brinkman | ............ | F16L 41/03 |
| | | | | 137/1 |
| 2015/0226343 A1* | 8/2015 | Jenks | ............ | F17D 3/00 |
| | | | | 137/1 |

\* cited by examiner

CONTROL VALVE

PRIORITY/CROSS-REFERENCE TO RELATED APPLICATIONS

This application is a continuation in part of U.S. Nonprovisional application Ser. No. 15/285,954 filed Oct. 5, 2016 which is a continuation of U.S. Nonprovisional application Ser. No. 14/529,439 filed Oct. 31, 2014 which claims the benefit of U.S. Provisional Application No. 61/926,689, filed Jan. 13, 2014, the disclosures of which are incorporated by reference.

TECHNICAL FIELD

The presently disclosed and claimed technology generally relates to an apparatus for fluid and/or gas flow control by a new control valve.

BACKGROUND

Valves regulate, control, and direct the flow of fluids and/or gas that come from one source to another source. A valve is an apparatus that is used to the change the direction and flow of moving fluid and/or gases. Valves can be used to raise and lower pressure of fluids and/or gases flowing in a direction. Additionally, valves have been used to obstruct fluids and/or gases flowing in one direction, while redirecting it in another direction.

Valves have a multitude of uses, such as in the irrigation industry, residential and commercial property industry, and automobile industry, among a plethora of other industries. Valves have penetrated society because of their usefulness. Safety valves, pressure valves, temperature valves, hydraulic valves, pneumatic valves, solenoid valves, and piston valves are example of types of valves.

Valves have a categorically broad field of form and application varying in size, and type. Valves are used in moving fluids and/or gases.

Many valves comprise of ports and passage ways which are passages that fluids and/or gases pass through. Ports can be obstructed when in use which is the function of a properly functioning valve. The obstruction of ports controls the flow of the fluids and/or gas. Most valves contain two or more controlled by a disc or ball that is actuated by a mechanism, sensor, or manually. Some valves are actuated automatically.

Ball valves are a form of valve which has two configurations: open and closed. When open, a ball valve allows fluid and/or gas to flow through a hollowed center of a ball or spherical flow control using an actuator to rotate the valve to align passageways through the valve with openings in the housing of the valve. For example when closed, the hollowed passageway of one type of ball valve is perpendicular to the incoming fluid and/or gas which prohibits the flow of fluid and/or gas. Ball valves can be metal, plastic, ceramic, or some other useful material.

Definitions

The use of the phrase "in the alternative," "other sources," "different sources," "e.g.," "etc," and "or" indicates non-exclusive alternatives without limitation unless otherwise noted.

The use of the phrases "fluid", "gas" or "fluid and/or gas" relates to all categories of fluids, liquids, solids turned liquid, and all categories of gases, vapors, melts, and condensations.

SUMMARY OF DISCLOSURE

The purpose of the Summary of Disclosure is to enable the public, and especially the scientists, engineers, and practitioners in the art who are not familiar with patent or legal terms or phraseology, to determine quickly from a cursory inspection, the nature and essence of the technical disclosure of the application. The Summary of the Invention is neither intended to define the invention of the application, which is measured by the claims, nor is it intended to be limiting as to the scope of the invention in any way.

What is disclosed is a valve. This valve can be configured to for the flow of fluid and/or gas through several passageways and ports in a preferred embodiment. There are different configurations: a first position, and a second position, etc. Each position is unique and allows for different sources of fluid and/or gas to flow through different ports. The valve is a ball valve in some embodiments.

When connected to an external hose, pipe, or other sources, the first inlet port allows for the flow of fluid and/or gas to the inner part of the valve. When the fluid and/or gas reach the inner part of the valve it will travel through a spherical flow control (or "ball") within the valve housing. Depending on what position the valve is in, the fluid and/or gases will be directed either from the first inlet port to the first outlet port; or the first inlet port to the second outlet port and the second inlet port to the first outlet port.

In the first position, the fluid and/or gas will pass from the first inlet port through the first inner passage way and out of the first outlet port. In a preferred embodiment, in the first position, the only passage of fluid and/or gas is from the first inlet port to the first outlet port and the other passage ways and ports are not utilized.

In the second position, fluid and/or gas will enter through the first inlet port and travel though the outer passage way of the valve which will direct the flow of fluid and/or gas to the second outlet port. Fluid and/or gas flows through the second inlet port and pass through the ball valve through the second inner passage way to the first outlet port.

An actuator, such as a handle, solenoid, or other actuator, selectively determines the position of the valve. In a preferred embodiment, the actuator sits adjacent to the first chamber of the valve. In a preferred embodiment in which the actuator is a handle, the handle is connected to the ball valve using a handle coupling mechanism which is coupled to a shaft attached to the ball valve. The handle is rotated to change the position of the ball valve in a preferred embodiment. When the handle is turned in one direction, the ball valve is configured to be in the first position. When the handle is rotated in another direction from the first position, the valve is configured to be in the second position. A handle stop can be utilized to ensure the ball valve is in the correct orientation of first position or second position.

In the preferred embodiment, the ball valve has different passageways: the first inner passageway, the second inner passageway, an outer passageway, or other alternative passage ways. The first inner passageway of the ball valve is located on the circumference of the ball valve or another alternative. The second inner passageway generally is perpendicular to the first inner passageway or another alternative. The second inner passageway provides a passage way in the circumference of the ball valve and intersects with the first inner passageway, or another alternative. Fluid and/or gas flows through the first inner passageway and through the second inner passageway depending on which position the handle is positioned. If the handle is in the first positon, fluid and/or gas will travel from the first inlet port to the first outlet port. If the handle is in the second position, fluid and/or gas will travel from the first inlet port to the second outlet port and from the second inlet port to the first outlet port. When the ball valve is in the first position, and fluid and/or gas flows through the first inlet port through the first passageway and out the first outlet port of the valve. Fluid and/or gas do not flow through the second passageway because the second passageway is blocked by the inside of the housing of the first chamber. Fluid and/or gas will not flow through the outer passage way when the valve is in the first position because the outer passage way will be blocked.

In a preferred embodiment, when the valve is in the second position the second inner passage way and the outer passage way of the ball valve are configured to be in an engaged position. When in this configuration, fluid and/or gas will flow through the first inlet port to the ball valve then though the outer passage way. Fluid and/or gas can then flow through the outer passage way to the second outlet port. Fluid and/or gas can flow from the second inlet port to the ball valve through the second inner passage way and to the first outlet port.

In further embodiment, the second outlet port is in a second chamber. In a preferred embodiment, there are two chambers to the valve. The first chamber has a first inlet port, first outlet port, and a second inner port. The second chamber has a second outlet port. In the first position, the second chamber is blocked from receiving fluid and/or gas from the first chamber. In the second position, fluid and/or gas will come through the first inlet port in the first chamber, and out of the second outlet port in the second chamber.

In a preferred embodiment, the valve is made of brass or an alternative material including but not limited to other metals, and plastics. The valve can be configured to allow for the connection of different types and sizes of hoses, pipes, or other sources.

In a preferred embodiment, the first inlet port and the first outlet port are threaded female ports. In a preferred embodiment, the second inlet port and the second outlet port are threaded male connections. However, any configuration from alternative sources using alternative connections such as quick connects, hose clamps, or other connection can be used to connect fluid and/or gas lines.

The valve comprises one or more seals or gaskets that fill the space between the ball valve and the chamber. In the preferred embodiment, the valve comprises of one or more neoprene gaskets that encapsulate the ball valve and have openings corresponding with openings in the circumference of the ball or spherical control of the valve. These gaskets help form a seal to prevent leakage of fluid and/or gas from penetrating to a passage not meant to be utilized. The seals can vary in shape, material, and dimensions.

Still other features and advantages of the claimed invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the description of the preferred embodiments is to be regarded as illustrative in nature, and not as restrictive in nature.

DETAILED DESCRIPTION OF THE PREFERRED EMBODIMENTS

Figure 1:
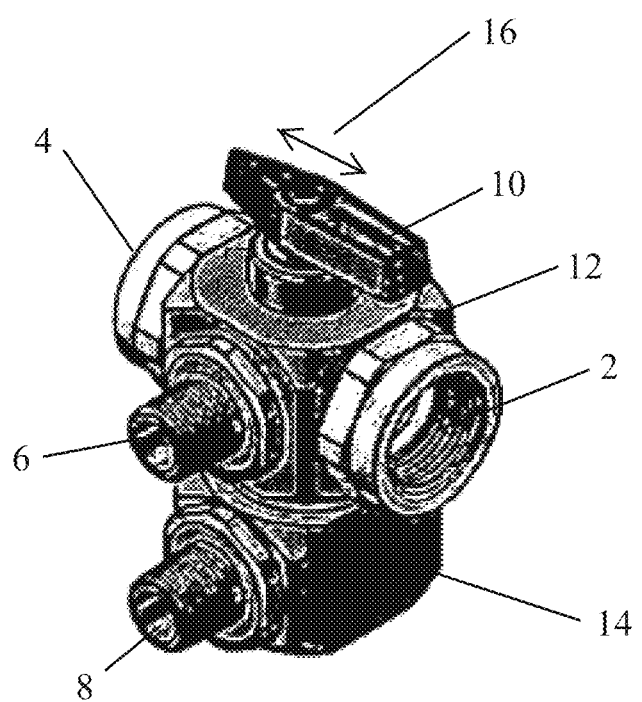
FIG. 1 is a front right perspective view of a preferred embodiment of a valve.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Certain preferred embodiments of the disclosed technology are shown FIGS. 1 through 7.

Disclosed in FIG. 1 is a diagram of a front right perspective view of the valve. The valve can be used with various forms of fluids and/or gases. The fluids and/or gases used with the valve can vary in temperature. FIG. 1 shows a first inlet port (2) and a first outlet port (4). When the handle (10) is in the first position (16) the valve allows for flow through the first inlet port (2), first inner passage way (24), and a first outlet port (4).

While in the first position (16), fluid and/or gas that pass through the first inlet port (2) is prevented from escaping through the second outlet port (8) due to the position of the ball valve (32). When the exchange value is in the first position (16), fluid and/or gas cannot pass through the second inner passage way (26) because it is open to the inside of the first chamber (12). The first position of the valve is set using the handle (10) which is coupled with the ball valve (32) using a handle coupling mechanism (18) that is connected to the ball valve shaft (10). FIG. 1 displays the second inlet port (6) and the second outlet port (8) that is in the second chamber (14) which are not utilized when the valve is in the first position (16).

As shown in FIG. 1, the first chamber (12) of the valve comprises of the first inlet port (2), second inlet port (6), and the first outlet port (4).

Figure 2:
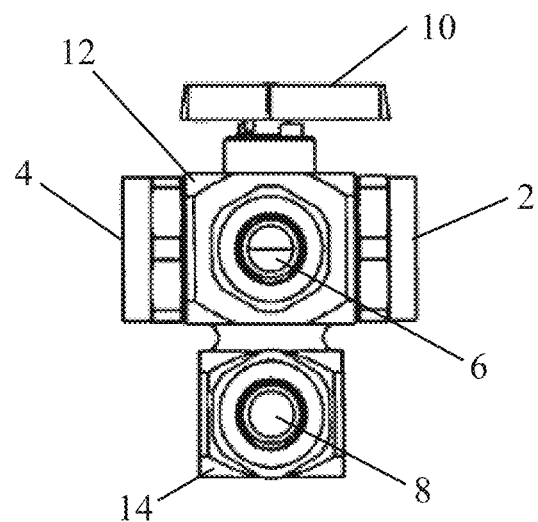
FIG. 2 is a front side view of a preferred embodiment of a valve.

FIG. 2 is a front view of the valve. As shown, the first inlet port (2) is on the right and the first outlet port (4) is on the left. The handle (10) is on the top of the valve. The first chamber (12) and the second chamber (14) are shown from the front view. In the center of the first chamber is the second inlet port (6). In the center of the first chamber is the second outlet port (8).

Figure 3:
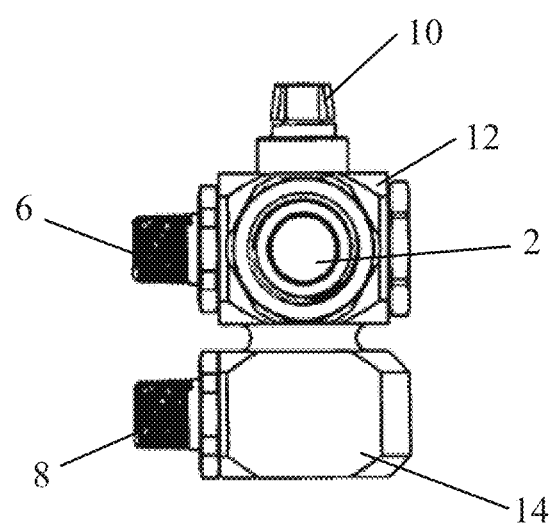
FIG. 3 is a right side view of a preferred embodiment of a valve.

FIG. 3 is a right view of the valve. Shown is the handle (10) in the first position (16). The first chamber (12) sits on top of the second chamber (14). The second inlet port (6) and the second outlet port (8) are displayed as threaded male valves. These valves can connect to external hoses, piping, or other sources. The first inlet port (2) is a female threaded valve which can connect to an external hose, pipe, or other sources.

Figure 4:
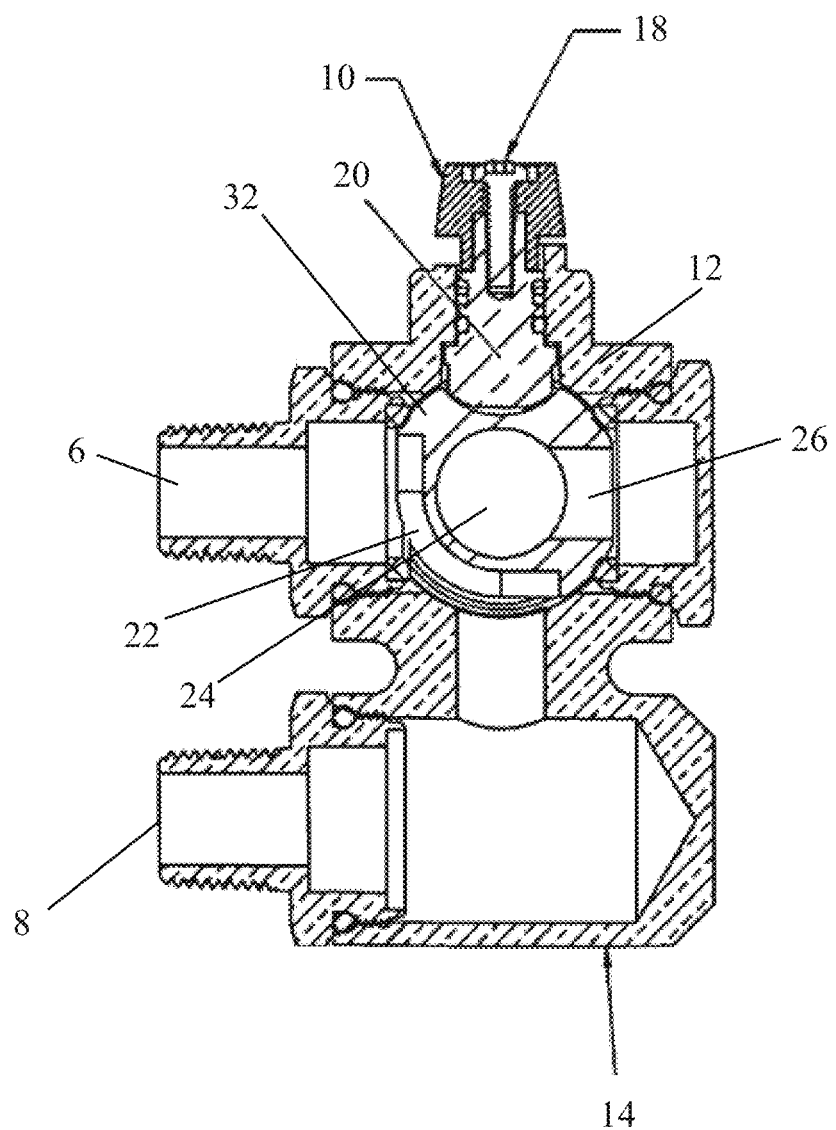
FIG. 4 is an internal right view of a preferred embodiment of a valve.

FIG. 4 is an internal right view of the valve. In this view, the handle (10) is in the first position (16). Shown is the handle coupling mechanism (18) which couples the handle to the ball valve shaft (20). The ball valve shaft (20) along with the handle (10) are used to rotate the ball valve (32) between the first position (16) and the second position (30). The ball valve shaft (20) and the ball valve (32) are in the first chamber (12). When in the first position (16) the first inner passage way (24) allows for fluid and/or gas to flow from the first inlet port (2) to the first outlet port (4). When in the first position (16), the second inner passage way (26) leads to the inside housing of the first chamber (12), disallowing the flow of fluid and/or gas through the second inner passage way (26). When the valve is in the first position (16), the outer passage way (22) of the ball valve (32) is rotated to the second inlet port (6) and the second outlet port (8) causing fluid and/or gas from the first inlet port (2) to not travel through the outer passage way (22).

Figure 5:
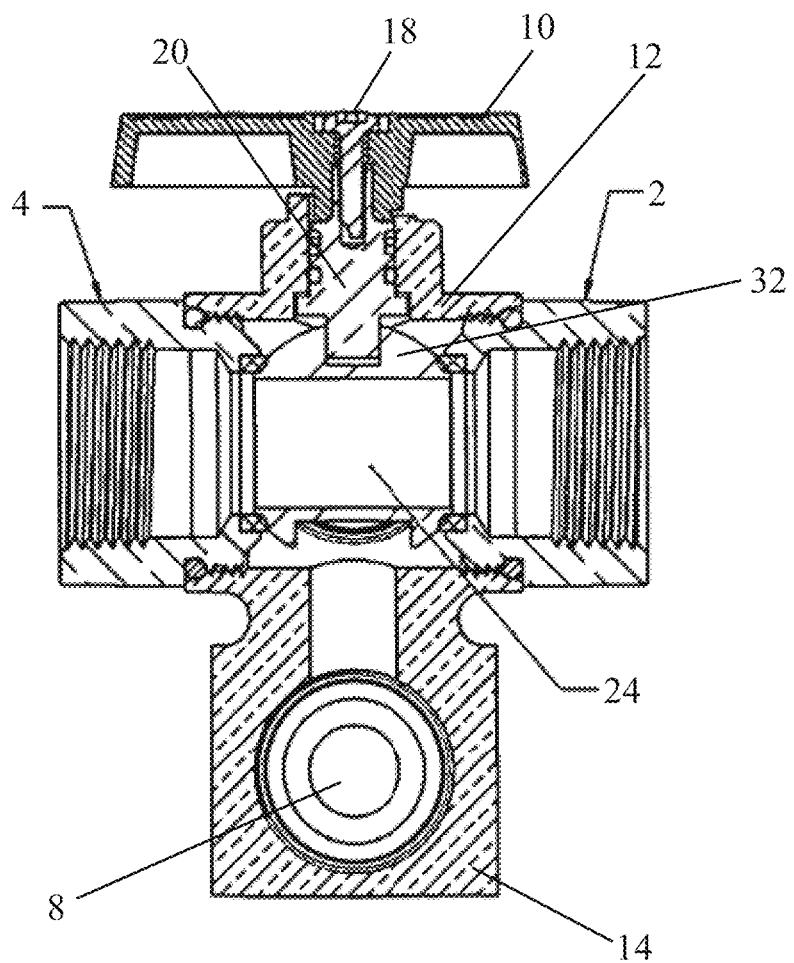
FIG. 5 is an internal front view of a preferred embodiment of a valve.

FIG. 5 is an internal front view of the valve. Shown is the handle (10) which is coupled to the ball valve shaft (20) using the handle coupling mechanism (18). The handle is in the first position (16) thus allowing fluid and/or gas to flow from the first inlet port (2) through the first inner passage way (24) and out the first outlet port (4). In this configuration the second outlet port (8) which is in the second chamber (14) is not used. The ball valve (32) is in the first chamber (12), which is above the second chamber (14).

Figure 6:
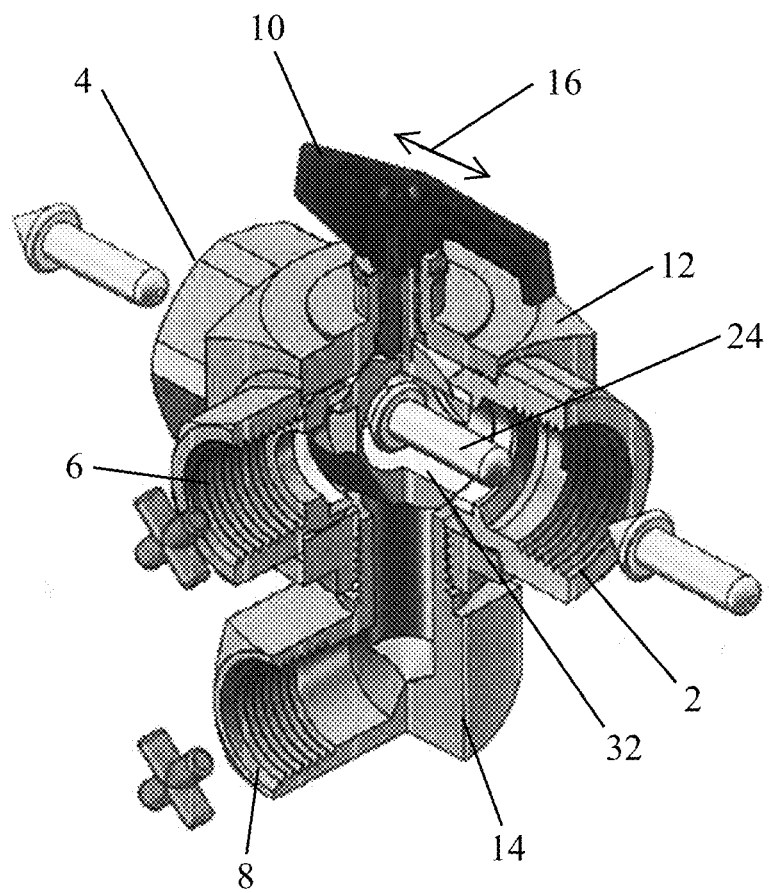
FIG. 6 is an internal front right perspective view of the inner workings with the outer casing removed in a preferred embodiment of a valve in a first position.

FIG. 6 is an internal front right perspective view of the inner workings with the outer casing removed in a preferred embodiment of a valve in a first position (16). In this figure, the handle (10) which sits on top of the first chamber (12) is in the first position (16). The ball valve (32) is shown to allow the first inner passage way (24) to be positioned for the flow of a fluid and/or gas between the first inlet port (2) and the first outlet port (4). In this configuration, the second inlet port (6) and the second outlet port (8) are not used.

Figure 7:
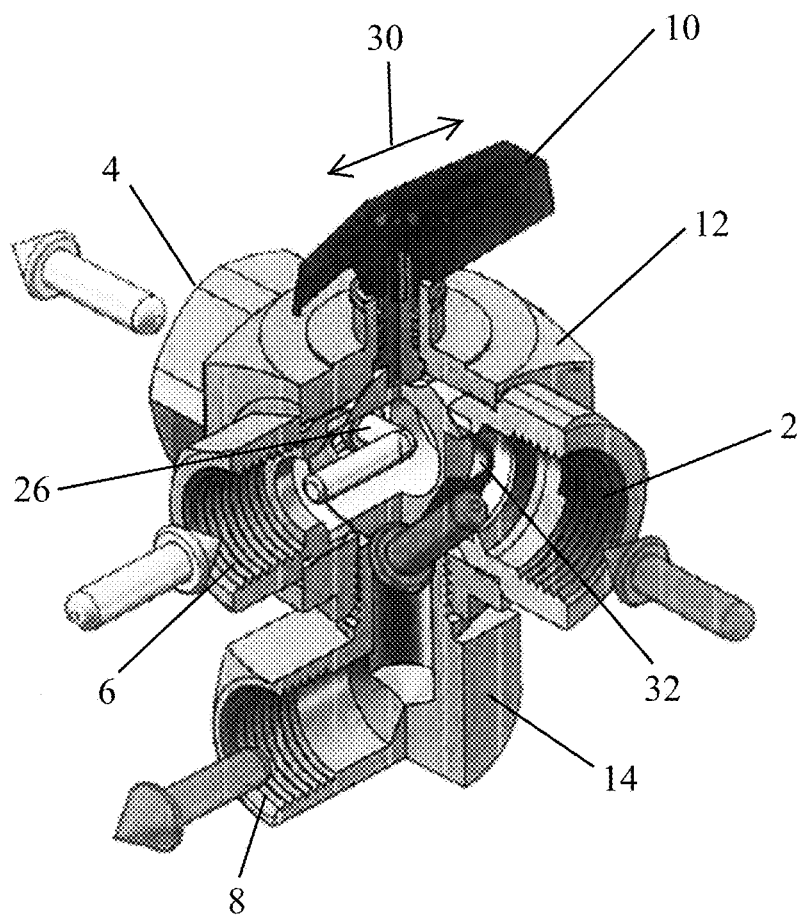
FIG. 7 is an internal front right perspective view of the inner workings with the outer casing removed in a preferred embodiment of a valve in a second position.

FIG. 7 is an internal front right perspective view of the inner workings with the outer casing removed in a preferred embodiment of a valve in a second position (30). In this figure, the 3-way ball valve (32) is rotated by use of the handle (10) into the second position (30). In this configuration, fluid and/or gas from the first inlet port (2) passes to the second outlet port (8) through the outer passage way (22). Additionally, fluid and/or gas from the second inlet port (6) passes through the second inner passage way (26) to the second inlet port (6).

I claim:

1. A ball valve, said ball valve comprising:
a housing, said housing having a spherical flow control comprising an actuator configured for moving said spherical flow control from a first position to a second position, wherein said spherical flow control comprises a circumference, wherein said housing comprises a first inlet passageway and a first outlet passageway configured for fluid connection when said spherical flow control is in said first position, wherein said spherical flow control is positioned between said first inlet passageway and said first outlet passageway so as to control the flow of fluid between said first inlet passageway and said first outlet passageway, wherein said spherical flow control comprises a first hollow passageway, wherein said first inlet passage way and said first output passageway are configured for fluid connection via said first hollow passageway when said spherical flow control is in said first position, but not in said second position;
wherein said housing comprising a second outlet passageway and a second inlet passageway, wherein said second inlet passageway and said first outlet passageway are configured for fluid connection when said spherical flow control is in said second position, but not when said spherical flow control is in said first position;
wherein said first inlet passageway and said second outlet passageway are configured for fluid connection when said spherical flow control is in said second position, but not when said spherical flow control is in said first position;
wherein said second inlet passageway and first outlet passage way are configured to be in fluid connection in said second position, but not when said spherical flow control is in said first position.

2. The ball valve of claim 1, wherein said ball valve comprises a gasket positioned on said circumference of said spherical flow control.

3. The ball valve of claim 1, wherein said fluid connection between said second inlet passageway and said first outlet passageway in said second position comprises a channel in the circumference of said spherical flow control.

4. The ball valve of claim 1, wherein said fluid connection between said second inlet passageway and said first outlet passageway comprises a second hollow passageway in said spherical flow control proximate to said circumference of said spherical flow control.

5. The ball valve of claim 1, wherein said first hollow passageway in said spherical flow control comprises a hollow passageway through a center of said spherical flow control.

6. The ball valve of claim 1, wherein said fluid connection between said first inlet passageway and said second outlet passageway comprises a hollow passageway in said spherical flow control generally at a ninety degree angle to said first hollow passageway in said spherical flow control and configured for fluid connection with said first hollow passageway.

7. The ball valve of claim 1, wherein said fluid connection between said first inlet passageway and said second outlet passageway comprises a generally T-shaped passageway through said spherical flow control comprising three openings in said circumference of said spherical flow control, wherein said openings comprise a first and a second opening connected by a linear section of said T-shaped passageway, wherein when said spherical flow control is in said first position said first inlet passageway and said second outlet passageway are in fluid connection via said first and second opening, wherein when said spherical flow control is in said second position said first inlet passageway and said second outlet passageway are configured to be in fluid connection via said first opening and a third opening in said generally T-shaped passageway.

8. The ball valve of claim 1, wherein said first hollow passageway comprises a first hollow passageway through a diameter of said spherical flow control.

9. The ball valve of claim 1, wherein said actuator is selected from the group consisting of a handle, a solenoid, and an actuated ball valve.

10. The ball valve of claim 1, wherein said first inflow passageway, said first outflow passageway, said second outflow passageway, and said second inflow passageway are configured to connect to a plurality of external hoses and/or pipes configured for the passage of fluid and/or gas.

* * * * *